Figure 1:
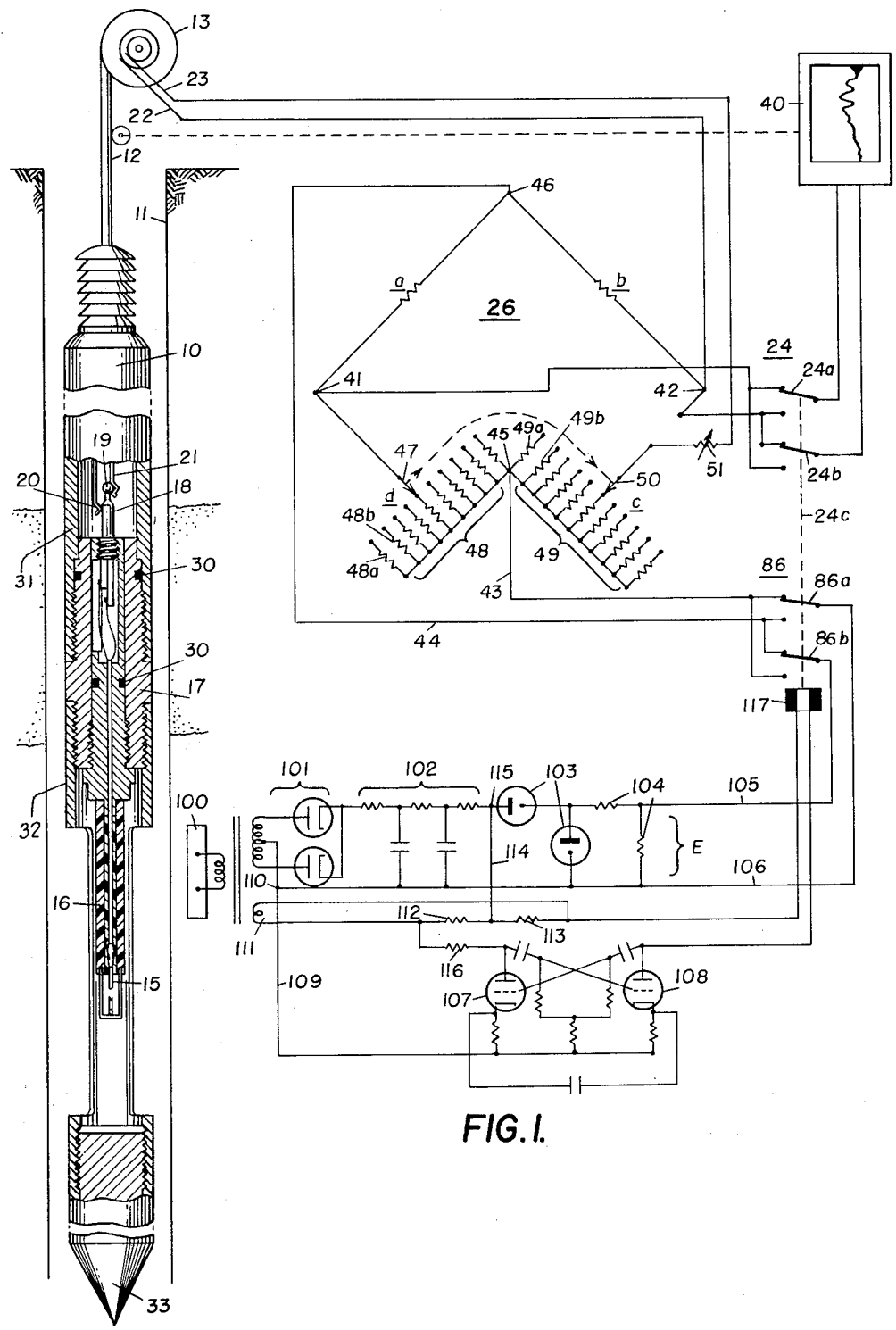

July 17, 1962 H. D. HODGES ETAL 3,044,298
UNBALANCED BRIDGE MEASUREMENTS OF BOREHOLE TEMPERATURE
Filed Dec. 16, 1957 2 Sheets-Sheet 1

July 17, 1962   H. D. HODGES ETAL   3,044,298
UNBALANCED BRIDGE MEASUREMENTS OF BOREHOLE TEMPERATURE
Filed Dec. 16, 1957   2 Sheets-Sheet 2

United States Patent Office
3,044,298
Patented July 17, 1962

3,044,298
UNBALANCED BRIDGE MEASUREMENTS OF BOREHOLE TEMPERATURE
Hayden D. Hodges and James T. Dean, Dallas, Tex., assignors, by mesne assignments, to Socony Mobil Oil Company, Inc., New York, N.Y., a corporation of New York
Filed Dec. 16, 1957, Ser. No. 702,929
4 Claims. (Cl. 73—362)

This invention relates to the measurement of properties in a borehole and more particularly to an unbalance bridge measurement in which a plurality of temperature ranges may be selected as to restrict bridge unbalance to a limited range and within such range causing measurements to be linear in terms of temperature.

Measurement of temperatures in oil wells and the like has been carried out primarily by lowering a temperature sensing element on a steel cable to the depth of interest and impressing a permanent indication of the temperature encountered at a given level on a recording element lowered into the borehole with the sensing element. There has been a need for a system for sensing borehole temperatures with surface indication thereof in order to conserve time and effort in borehole studies.

In accordance with the present invention there is provided a system for logging temperature in a well bore with surface indicating means through the use of a Wheatstone bridge whose operation in an unbalance state is limited to a predetermined range of unbalance for each of a plurality of segments of the range of temperatures to be accommodated. More specifically, there is provided a Wheatstone bridge having a circuit in one arm thereof which extends into the well bore. A temperature sensitive element is connected in the latter circuit and exposed to the temperatures in the well bore for variations of the resistance thereof as a known function of temperature. A measuring means is connected across one diagonal of the bridge to measure unbalance currents over a predetermined range. A current source is connected across the second diagonal of the bridge for producing current flow therein. A plurality of impedances are provided in an arm adjacent to said one arm and are adapted selectively to be connected in an ordered sequence to the arm of said bridge and are of varying magnitude along the sequence as to change stepwise the unbalance current flowing through the detecting means by amounts equal to said predetermined range.

In accordance with a further aspect of the invention, there is provided a borehole sensing tool carrying a temperature sensitive resistance. A circuit extending to the earth's surface is connected into one arm of a Wheatstone bridge and in series in said arm with resistance means which may be varied stepwise. A second resistance means which may be varied stepwise is connected in an adjacent arm of the bridge. A detecting means is connected across a diagonal of said bridge which forms a circuit connected in parallel to said arms whereby variations in the resistance of said temperature sensitive element will produce current variation through said diagonal. The detecting means is adapted to measure unbalance currents over a predetermined range where said range is equal to the change in unbalance current produced upon stepwise variation of the impedances in said arms of said bridge.

In accordance with a preferred embodiment of the invention, bridge unbalance is permitted over a range wherein the unbalance current which is characteristically nonlinear is complementary to the effect produced by a nonlinear temperature sensing element so that the bridge unbalance current will be linear in terms of temperature.

Figure 2:
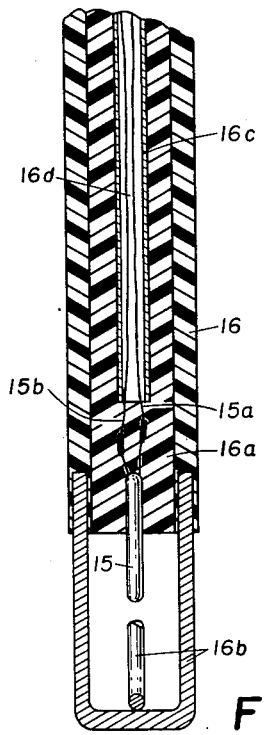
Figure 4:
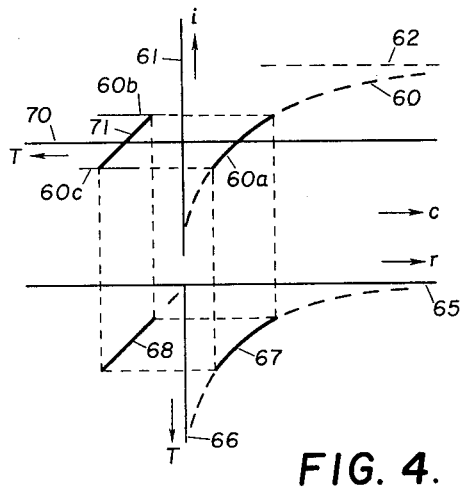
Figure 3:
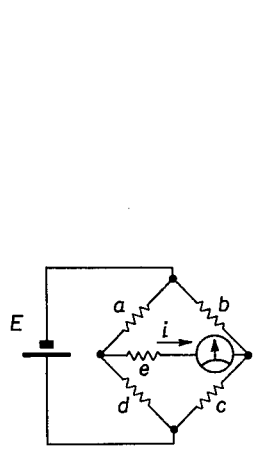
Figure 5:
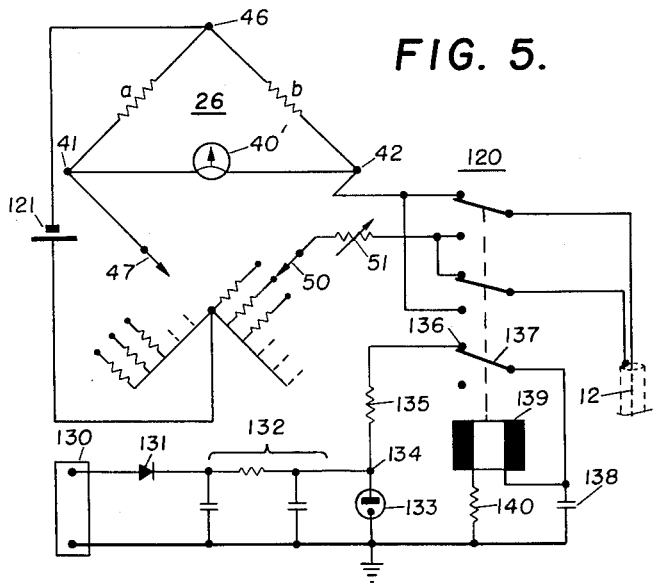

For a more complete understanding of the present invention and for further objects and advantages thereof, reference may now be had to the following description taken in conjunction with the accompanying drawings in which:

FIG. 1 is a diagrammatic view of the present invention;
FIG. 2 is a detailed sectional view of the borehole temperature sensing element;
FIG. 3 is a simplified bridge diagram;
FIG. 4 is a graphical representation of certain variables in the bridge circuit of FIGS. 1 and 3; and
FIG. 5 is a further modification of the invention.

Referring now to FIG. 1, there is illustrated an exploring element 10 positioned in a borehole 11 and supported by a cable 12 from a reel 13 for movement along the length of borehole 11. Reel 13 may be provided with suitable drive means (not shown) for conveniently controlling or selecting the depth at which the unit 10 may be located.

Unit 10 includes a temperature sensitive resistance 15 mounted in the end of a mandrel 16 which is threaded into a tubular support 17. A pair of conductors leading from the terminals of the sensitive element 15 extend through mandrel 16 and tubular support 17 and are terminated in the two terminals 18 and 19 of a telephone-type plug which cooperates with contacts 20 and 21 of a suitable jack. A circuit (not shown) then extends from contacts 20 and 21 through cable 12 to slip ring contacts 22 and 23 and thence to one arm of a bridge circuit 26.

The borehole unit is so constructed that the chamber in which terminals 20 and 21 are located is fluid-tight. O-rings 30 are provided to prevent entry of borehole fluids through the associated threaded connections into the cylindrical chamber formed by the tube 31. A shield 32 threadedly engages the lower end of the cylindrical support 17 and has slotted walls in the region of element 15 to permit free ingress and egress of fluid in the sensing zone. The lower end of shield 32 is adapted to receive an end member 33 which may include weighting means to facilitate travel of the unit 10 downwardly through the borehole and to minimize turbulence upon flow of fluids upward past the unit 10.

As best illustrated in the detailed sectional view of FIG. 2, the temperature sensitive element 15 which in one embodiment comprised a thermistor of the TX168 type, manufactured by Victory Engineering Company of Union, New Jersey, is mounted in a resinous insulating mass 16a with the end thereof extending below the end of the mandrel 16. A protective cage 16b is provided to encompass the temperature sensitive element 15. Conductors 15a and 15b extend from the temperature sensitive element 15 through a steel sheath 16c which is swaged over filler 16d of magnesia which surrounds the conductors 15a and 15b. The steel sheath 16c extends through the mandrel 16 to provide a fluid-tight seal and feed-through for the conductors 15a and 15b.

From the foregoing it will be seen that the borehole unit has but a single active element, the temperature sensitive element 15. Two conductors lead from element 15 to the earth's surface. The borehole unit 10 is adapted to provide ready contact between temperature sensitive element 15 and the borehole fluids so that variations in resistance will be applied to the bridge.

Bridge circuit 26 is designed to permit accurate determination of the temperature in the borehole by surface indicating means and more particularly by the bridge unbalance current flowing through a meter or a recorder 40 as shown in FIG. 1. The recorder 40 is connected across the first or horizontal diagonal of the bridge, i.e., between terminals 41 and 42 by way of a double pole, double throw switch 24 whose function will hereafter be described.

A D.C. source of current is connected across a second diagonal of bridge circuit 26 by means of conductors 43 and 44 leading to terminals 45 and 46. A resistance *a* is connected in the arm of the bridge between terminals 41 and 46. A resistance *b* is connected in the arm of the bridge between terminals 42 and 46. Resistor arms *a* and *b* ordinarily are referred to as the ratio arms of a Wheatstone bridge. The rheostat or variable arm of the Wheatstone bridge is arm *d* which is formed by a switch armature 47 which is adapted to be connected to any one of several resistances in the resistor bank 48. A similar bank of resistances 49 is provided in the unknown arm *c* of the bridge. A switch armature 50 is connected in series with a variable resistance 51 in the unknown arm *c*.

One terminal of variable resistance 51 is connected to the slip ring contact 23. Terminal 42 of bridge 26 is connected to slip ring contact 22. With the circuit thus completed, the unknown arm of bridge 26 includes element 15 and the circuit including conductors in cable 12 leading to reel 13, the circuit including slip ring contacts 22 and 23, variable resistance 51, switch armature 50, and a selected one of the resistances in the resistor bank 49.

The bridge is so designed through the provision of resistor banks 48 and 49 that unbalance operation may be employed to indicate temperature of fluids in the borehole accurately and linearly. More particularly, it is known that Wheatstone bridges are widely used primarily because of the accuracy with which measurements of impedance may be made at the null point. With the bridge balanced, the value of resistance of the rheostat arm is taken as an indication of the value of the resistance in the unknown arm.

In contrast with null type measurements, applicants so regulate the unbalance current flowing in the first diagonal of the bridge and through the recorder 40 that over a limited range the unbalance current is substantially linear with respect to borehole temperature. This is true even though the operating characteristic of such a bridge is non-linear and even though the temperature-resistance characteristic of the temperature sensing element 15 is non-linear.

It will be of assistance in understanding the operation of the bridge to refer to FIGS. 3 and 4. The unbalance current *i*, FIG. 3, flowing through the first diagonal of the bridge may be expressed in the following manner:

$$i = \frac{Ac - B}{Cc + D} \quad (1)$$

where $A = aE$
$B = bdE$
$C = b(a+d) + ad + ae + de$
$D = b(ad + ae + de)$ and where *a*, *b*, *c* and *d* represent the magnitude of the resistance in the ratio arms, the unbalance arm and the rheostat arm, respectively, *e* represents the magnitude of the resistance in the detecting diagonal, and E, the magnitude of the applied voltage.

In FIG. 4 there is plotted a first curve 60 which represents variation in current *i* as a function of variations in resistance *c*, the unknown arm of the bridge. Curve 60 may be derived and plotted from Equation 1. If the resistance *c* is of zero value, then the first term in both numerator and denominator in Equation 1 becomes zero, and the unbalance current *i* is equal to the ratio of $-B/D$. Curve 60 would thus have such an intercept on the axis 61. If Equation 1 is modified to the following form $$i = \frac{A - \frac{B}{c}}{C + \frac{D}{c}} \quad (2)$$

and if the unknown resistance *c* is infinitely large, the second terms of both numerator and denominator become vanishingly small and the unbalance current *i* is equal to $$\frac{A}{C}$$

Thus, the maximum value of unbalance current as approached by curve 60 and represented by the dotted line 62 has a value equal to the ratio $A/C$.

Although the curve is non-linear, it is desired to produce an indication on recorder 40 which is substantially linear in terms of temperature. To achieve such operation, a limited range of bridge unbalance current is selected, such as represented by the solid portion 60*a* of curve 60.

More particularly, the lower portion of FIG. 4 represents a plot of the variation of resistance *r* of unit 15 along axis 65 as a function of temperature T which is plotted along axis 66. This curve is descriptive of a particular temperature sensing element. The term *r* as used herein may comprise the resistance of the sensing element plus the resistance of the cable only, or may also include resistance which is connected in series or parallel with the cable at terminals of the bridge circuit.

Curve 67 is non-linear but is such that in operation the effect thereof on bridge unbalance current is complementary to the bridge unbalance curve 60 so that the unbalance currents may be substantially linear in terms of temperature. That portion of curve 67 which represents the same change in resistance as the bridge unknown resistance *c* is represented by the solid portion of the curve. By projecting the values of curve 67 to the diagonal 68 and thence upwards to intersect the limit lines 60*b* and 60*c* of the curve segment 60*a*, a substantially linear function of unbalance current *i* is obtained as a function of borehole temperature T. It will be noted that unbalance current *i* has been plotted along axis 61. It has been found that over a somewhat limited range of unbalance current linear operation may be thus achieved, the linear characteristic being represented by the line 71.

Having thus determined the range between maximum current value 60*b* and a minimum current value 60*c*, the banks of resistances 48 and 49, FIG. 1, in the unknown arm and the variable arm of bridge 26 may be selected.

It should be noted that the selector contact arms 47 and 50 are adapted to be moved sequentially along resistor banks 48 and 49 preferably simultaneously to vary the impedance in arms *c* and *d* of bridge 26. The variation in resistance thus effected in the bridge arms *c* and *d* preferably is such that the change in each step along resistor banks 48 and 49 will produce a change in current in the horizontal bridge diagonal of magnitude equal to the difference between the currents at limits 60*c* and 60*b* of FIG. 4. By this means a wide temperature range to which the element 15 is subjected may be covered stepwise by selecting segments through operation of the switch arms 47 and 50. In terms of the graph of FIG. 4, actuation of switch arms 47 and 50 serves to move curve 60 up or down to bring a new segment of the curve 60 into the range of unbalance currents 60*b*—60*c* and substantially to match the curvature of the corresponding portion of the resistance of the temperature sensing element.

The values of the resistances in the banks 48 and 49 may be computed from Equation 1 so that the entire temperature range T may be covered by bridge 26 in steps of any suitable increment. In practice it has been found wholly satisfactory to use empirical methods in the selection of the values of the resistances in the bridge. In one embodiment a range of borehole temperatures from 60° F. to 260° F. was covered in steps of 20° by suitable selection of the resistances in banks 48 and 49.

The mode of selecting the resistances was as follows. A calibrating resistance was substituted in place of element 15 at the end of cable 12 as by connecting it to terminals 20 and 21, FIG. 1. The calibrating resistor was adjusted to have the value representative of a temperature of 60° on curve 67. The resistances 48a and 49a were then adjusted to have such values that the indicator on recorder 40 was at one end, i.e., the zero end, of its scale.

The calibrating resistor was then adjusted to the value found on curve 67 representative of a temperature of 80°. The resistor 49a was then adjusted so that the indicator of recorder 40 was at the other end of its scale. At this point a first approximation to the correct values for resistors 48a and 49a was achieved. Thereafter the calibrating resistor was changed back to the value indicated on curve 67 for a temperature of 60°. Since the first setting of resistors 48a and 49a was approximate, the indicator on recorder 40 was not, and generally would not be, at the zero end of its scale. Resistor 48a was then adjusted again so that the indicator on meter 40 was at zero. The calibrating resistor was again changed to the value representative of an 80° temperature and resistor 49a was again adjusted. By successive adjustments of resistors 48a and 49a while alternating the values of the calibrating resistor from a 60° value to an 80° value, respectively, precise values for resistors 48a and 49a were determined. Switch arms 47 and 50 were then moved to connect resistors 48b and 49b in the circuit. The same procedure was then followed utilizing values of the calibrating resistor representative of 80° and 100° values taken from curve 67. Switch arms 47 and 50 were then moved successively to include all of the other pairs of resistances 48 and 49 in the bridge circuit to provide a calibration of the bridge for the complete range of temperatures represented by the curve 67.

Resistance 51 connected in series with the cable circuit in the unknown arm $c$ of brdge 26 is provided to compensate for variations in resistance of various borehole cables with which the system might be employed. The resistance 51 was selected to have such value that adjustments could be made therein so that the sum of the resistance of the cable and resistance 51 would total an arbitrary predetermined value. Since the borehole unit 10 and the measuring circuit including bridge 26 could readily be transported from place to place for use with various cables, each logging operation would be preceded by the initial adjustment of resistance 51 with terminals of the cable, such as terminals 20 and 21, short-circuited.

It has been found that the temperature measurements above described are accompanied by the appearance in the bridge circuit of potentials which have no relationship to the parameter under measurement and which unduly hinder temperature logging operations. In general, such potentials are unidirectional and are produced by voltaic action as the exploring unit 10 and cable 12 are immersed in electrolytes such as salt water. Such potentials are particularly troublesome since the nominal resistance of the temperature sensing element 15 must be relatively high in order to permit variations therein in response to temperature changes sufficient to permit temperature measurements of desired accuracy.

In avoidance of the effect of such unwanted potentials, there is provided, in FIG. 1, means for periodically reversing the polarity of voltage applied to terminals 45 and 46 and for synchronously reversing the connection between the bridge 26 and the recorder 40. Switch 24 having switch arms 24a and 24b actuated by the linkage 24c is effective periodically to reverse connection between recorder 40 and bridge 26 at intervals which are short compared to the period of the recorder 40. Switching transients will thus be eliminated and the average value of bridge unbalance will be due solely to variation in the resistance of element 15.

Conductors 43 and 44 leading to terminals 45 and 46 of the bridge are connected to a suitable D.C. voltage source by way of a second double pole, double throw switch 86. A circuit leading from switch armatures 86a and 86b is connected to the D.C. voltage source. The coupling 24c is effective simultaneously to actuate switch arms 24a, 24b, 86a and 86b.

The circuit for deriving the drive voltage E for he bridge and for actuating the reversing switch 86 includes an alternating voltage source 100 connected to a full-wave rectifier 101 whose output is passed through a suitable filter 102 to voltage regulating tubes 103. The regulated output is then applied to a dividing network 104 so that a unidirectional voltage E is applied by way of conductors 105 and 106 to armatures 86a and 86b.

A synchronized free-running multivibrator including tubes 107 and 108 is connected from the cathode circuit thereof by way of conductor 109 to the ground conductor or negative terminal 110 of the power supply. An alternating voltage derived from source 100 by way of transformer secondary winding 111 is connected across series resistors 112 and 113. The juncture between resistances 112 and 113 is connected by way of conductor 114 to the B+ terminal 115 of the power supply. Resistance 112 is connected by way of resistance 116 to the anode of tube 107. Resistance 113 is connected by way of the relay actuating coil 117 to the anode of tube 108. Resistance 116 preferably is the same as that of the relay coil 117 so that, insofar as the multivibrator is concerned, a balanced circuit is maintained. The introduction of the alternating voltage from transformer winding 111 into the anode circuits of the multivibrator provides the synchronizaton for periodically switching conduction between tubes 107 and 108 for the actuation of the switch 86. Thus the rate of switching is at the frequency or subharmonic of the alternating voltage from source 100.

In FIG. 5 there is illustrated in simplified form a measuring circuit similar to that of FIG. 1 except that the connections between cable 12 and bridge 26 are periodically reversed by switch 120. The voltage for operating bridge 26 may be derived from a battery 121 and the meter 40' or, alternatively a recorder such as recorder 40, FIG. 1, may be connected directly across the horizontal bridge diagonal or to points 41 and 42. By actuation of switch 120, the unwanted potentials which may appear between the outer conductor and the center conductor of cable 12 will be eliminated. In the system of FIG. 5 the switch 120 is actuated by means including an alternating voltage source 130 which is connected through a rectifier 131 to a filter 132. A voltage regulator tube 133 is connected between filter output terminal 134 and ground. Resistance 135 is connected between terminal 134 and switch terminal 136. Switch arm 137 is connected by way of condenser 138 to ground and by way of relay coil 139 and resistor 140 to ground. The time constant of the circuit of relay coil 139 is so selected that the armatures of switch 120 including armature 137 simultaneously will be actuated at intervals which are short compared to the period of the meter 40'. In either case, unwanted potentials are eliminated and accurate temperature measurements are provided.

The foregoing has including a description of a system for eliminating unwanted potentials in the bridge circuit. This system is described and claimed in the copending application of John K. Godbey, a coworker of applicants, Serial No. 702,865, filed December 16, 1957.

While the invention has been described in connection with certain specific embodiments thereof, it will now be understood that further modifications will suggest themselves to those skilled in the art and it is intended to cover such modifications as fall within the scope of the appended claims.

What is claimed is:

1. A well bore temperature logging system which comprises a Wheatstone bridge, a circuit in one arm of said bridge which includes a borehole cable, a temperature sensitive element connected to the extremities of said cable and adapted to be lowered with said cable into said well bore to be exposed to temperatures over a plurality of ranges therein to produce non-linear variations in the resistance thereof in accordance with temperature changes, measuring means connected across a first diagonal of said bridge to measure bridge unbalance current over a predetermined range, a current source connected across a second diagonal of said bridge for producing current flow in said first diagonal in response to variations in the resistance of said temperature sensitive element over said plurality of temperature ranges, impedance means in adjacent arms of said bridge for restricting said bridge unbalance current to said predetermined range over said plurality of temperature ranges and for matching the non-linear current-resistance characteristics of said bridge within said predetermined range with said non-linear resistance-temperature characteristics of said element to obtain a linear relationship between said unbalance current and said borehole temperature over each said temperature range.

2. A well bore temperature logging system which comprises a Wheatstone bridge, a circuit in one arm of said bridge which includes a borehole cable, a temperature sensitive element connected to the extremities of said cable and adapted to be lowered with said cable into said well bore to be exposed to temperatures over a plurality of ranges therein to produce non-linear variations in the resistance thereof in accordance with temperature changes, measuring means connected across a first diagonal of said bridge to measure bridge unbalance current over a predetermined range, a current source connected across a second diagonal of said bridge for producing current flow in said first diagonal in response to variations in the resistance of said temperature sensitive element over said plurality of temperature ranges, impedance means in said one arm and in an adjacent arm of said bridge for restricting said bridge unbalance current to said predetermined range over said plurality of temperature ranges and for matching the non-linear current-resistance characteristics of said bridge within said predetermined range with said non-linear resistance-temperature characteristics of said element to obtain a linear relationship between said unbalance current and said borehole temperature over each said temperature range.

3. A well bore temperature logging system which comprises a Wheatstone bridge, a circuit in one arm of said bridge which includes a borehole cable, a temperature sensitive element connected to the extremities of said cable and adapted to be lowered with said cable into said well bore to be exposed to temperatures over a plurality of ranges therein to produce non-linear variations in the resistance thereof in accordance with temperature changes, measuring means connected across a first diagonal of said bridge to measure bridge unbalance current, a current source connected across a second diagonal of said bridge for producing current flow in said first diagonal in response to variations in the resistance of said temperature sensitive element over said plurality of temperature ranges, a first plurality of variable impedances adapted selectively to be connected in an ordered sequence into said one arm of said bridge and a second plurality of variable impedances adapted selectively to be connected in an ordered sequence into an adjacent arm of said bridge for matching the non-linear current-resistance characteristics of said bridge with said non-linear resistance-temperature characteristics of said element over said plurality of temperature ranges which said element is subjected to obtain a linear relationship between said unbalance current and the borehole temperature over each said temperature range.

4. A well bore temperature logging system which comprises a Wheatstone bridge having two ratio arms, a rheostat arm and an unknown condition arm, a circuit in said unknown condition arm which includes a borehole cable, a temperature sensitive element connected to the extremities of said cable and adapted to be lowered with said cable into said well bore to be exposed to temperatures over a plurality of ranges therein to produce non-linear variations in the resistance thereof in accordance with temperature changes, a voltage source connected to terminals at the extremities of a first diagonal at the juncture of said ratio arms and at the juncture of said rheostat arm and said unknown condition arm, measuring means connected between terminals at the extremities of a second diagonal of said bridge for measuring bridge unbalance current over a predetermined range, means for supporting said element in a well bore, impedance means in said unknown condition arm and in said rheostat arm for restricting said bridge unbalance current to said predetermined range over said plurality of temperature ranges and for matching the non-linear current-resistance characteristics of said bridge within said predetermined range with said non-linear resistance-temperature characteristics of said element to obtain a linear relationship between said unbalance current and said borehole temperature over each said temperature range.

References Cited in the file of this patent

UNITED STATES PATENTS

| | | |
|---|---|---|
| 2,455,520 | Prudhon et al. | Dec. 7, 1948 |
| 2,649,715 | Goble | Aug. 25, 1953 |

FOREIGN PATENTS

| | | |
|---|---|---|
| 614,628 | Great Britain | Dec. 20, 1948 |

OTHER REFERENCES

Article by Beakley, in Journal of Scientific Instruments, v. 28, No. 6, June 1951, pages 176–179.